US007668817B2

(12) United States Patent
Enomoto et al.

(10) Patent No.: US 7,668,817 B2
(45) Date of Patent: Feb. 23, 2010

(54) METHOD AND SYSTEM FOR DATA PROCESSING WITH SPATIAL SEARCH

(75) Inventors: Masaki Enomoto, Tokyo (JP); Masaaki Tanizaki, Nishitokyo (JP); Yoshitaka Atarashi, Kawasaki (JP); Kohji Kimura, Fujisawa (JP)

(73) Assignees: Hitachi, Ltd., Tokyo (JP); Hitachi Software Engineering Co., Ltd., Kanagawa (JP)

( * ) Notice: Subject to any disclaimer, the term of this patent is extended or adjusted under 35 U.S.C. 154(b) by 171 days.

(21) Appl. No.: 11/674,263

(22) Filed: Feb. 13, 2007

(65) Prior Publication Data

US 2008/0016037 A1    Jan. 17, 2008

(30) Foreign Application Priority Data

Feb. 28, 2006   (JP) ............................. 2006-054160

(51) Int. Cl.
*G06F 17/30* (2006.01)
(52) U.S. Cl. ................... 707/4; 707/5; 707/6; 707/100; 707/104.1; 701/207; 701/208
(58) Field of Classification Search ................ 707/3–5, 707/100; 701/207–208
See application file for complete search history.

(56) References Cited

U.S. PATENT DOCUMENTS

| 5,440,730 | A | * | 8/1995 | Elmasri et al. | ............... | 707/203 |
| 5,806,061 | A | * | 9/1998 | Chaudhuri et al. | ............. | 707/3 |
| 6,081,804 | A | * | 6/2000 | Smith | ............................. | 707/5 |
| 6,308,177 | B1 | * | 10/2001 | Israni et al. | .................. | 707/100 |
| 6,381,605 | B1 |   | 4/2002 | Kothuri et al. | | |
| 6,578,031 | B1 | * | 6/2003 | Washizawa | .................... | 707/6 |
| 6,778,981 | B2 | * | 8/2004 | Lee et al. | ....................... | 707/3 |
| 6,834,278 | B2 | * | 12/2004 | Yu et al. | ......................... | 707/2 |
| 7,167,856 | B2 | * | 1/2007 | Lawder | ......................... | 707/3 |
| 7,248,965 | B2 | * | 7/2007 | Tanizaki et al. | ............. | 701/208 |

(Continued)

FOREIGN PATENT DOCUMENTS

JP       2001-014338        1/2001

(Continued)

OTHER PUBLICATIONS

Jack A. Orenstein << redundancy in spatial databases >>, vol. 18, Issue 2, Jun. 1989, pp. 294-305.*

(Continued)

*Primary Examiner*—Hung T Vy
*Assistant Examiner*—Hanh B Thai
(74) *Attorney, Agent, or Firm*—Mattingly & Malur, P.C.

(57) ABSTRACT

A method for processing data performed in a data processing system having a storage unit is provided which includes: creating a spatial index comprising a leaf containing location information and attribute information with respect to a plurality of objects to be searched, and storing the spatial index in the storage unit; and referring to the spatial index stored in the storage unit in response to an input of a search request including location information and attribute information for searching the object to be searched, and extracting the object to be searched that agrees with the search request. With this configuration, a spatial search with subsidiary condition search can be processed at high speed, without merging results of both searches.

13 Claims, 13 Drawing Sheets

U.S. PATENT DOCUMENTS

| | | | |
|---|---|---|---|
| 7,305,417 B2* | 12/2007 | Gray | 707/104.1 |
| 7,337,168 B1* | 2/2008 | Sigel et al. | 707/3 |
| 7,363,319 B2* | 4/2008 | Cappellini | 707/104.1 |
| 2002/0000986 A1* | 1/2002 | Sowizral et al. | 345/421 |
| 2004/0249809 A1* | 12/2004 | Ramani et al. | 707/4 |
| 2006/0059196 A1* | 3/2006 | Sato et al. | 707/104.1 |
| 2006/0136402 A1* | 6/2006 | Lee | 707/3 |
| 2006/0200359 A1* | 9/2006 | Khan et al. | 705/1 |
| 2006/0287984 A1* | 12/2006 | Chen et al. | 707/3 |
| 2008/0240619 A1* | 10/2008 | Kanawa | 382/305 |
| 2008/0281791 A1* | 11/2008 | Ito et al. | 707/3 |

FOREIGN PATENT DOCUMENTS

WO     01/46866     6/2001

OTHER PUBLICATIONS

Nakamura, Y., et al, "Data Structures for Multi-Layer N-Dimensional Data Using Hierarchical Structure", Proceedings of International Conference on Pattern Recognition, Atlantic City, N.J., Jun. 16-21, 1990, pp. 97-102.

* cited by examiner

METHOD AND SYSTEM FOR DATA PROCESSING WITH SPATIAL SEARCH

CROSS-REFERENCE TO RELATED APPLICATIONS

This application claims the foreign priority benefit under Title 35, United States Code, section 119 (a)-(d), of Japanese Patent Application No. 2006-054160, filed on Feb. 28, 2006 in the Japan Patent Office, the disclosure of which is herein incorporated by reference in its entirety.

BACKGROUND OF THE INVENTION

1. Field of the Invention

The present invention relates to a technique for processing stored data.

2. Description of the Related Art

In recent years, RDBMS (Relational DataBase Management System) that can manage multimedia data has increased. For example, this system has been used for storing map data as multimedia data, managing update of map data, and delivering map data to thin clients. A spatial search index technique has been also studied in order to search map data at high speed.

Also in a field of built-in device, DBMS (Database Management System) having a spatial search function has been developed, and application to other fields, such as a field of car navigation, is expected.

For the spatial search index, a space division method is frequently used, and there can be mentioned R-tree (see FIG. 11) and quad-tree (see FIG. 12). In these methods, a tree structure is formed by appropriately and consecutively dividing 2-dimensional space, in order to remarkably reduce a data processing number upon searching.

The R-tree shown in FIG. 11 is a method for managing spatial information by managing partial regions with bounding rectangles, and further by recursively and hierarchically managing bounding rectangles in the partial region. For a 1st level (1101) of the pertinent space, a bounding rectangle of the partial region is determined, and if desired, depending on a distribution of geometries to be managed in the 1st level (1101), a bounding rectangle as a 2nd level (1102) is determined. Like the 1st level (1101), if desired, depending on a distribution of geometries to be managed in the 2nd level (1102), a bounding rectangle as a 3rd level (1103) is determined. By recursively repeating this division, spatial information can be managed as a tree structure.

The quad-tree shown in FIG. 12 is a method for managing spatial information by regularly dividing a space into four parts at a predetermined proportion, and by recursively repeating the division. A pertinent space as a 1st level, (1201) is divided into four parts at a predetermined proportion, which are taken as a 2nd level (1202). Like the 1st level (1201), the 2nd level (1202) is divided into four parts at a predetermined proportion, which are taken as a 3rd level (1203). By recursively repeating this division, spatial information can be managed as a tree structure.

FIG. 13 is a flowchart showing one example of a conventional processing in which a spatial search is performed using an index of a tree structure with a space being divided into pieces, as shown in FIGS. 11 and 12. First, spatial search conditions are obtained (Step 1301); the tree structure of the spatial search index is recursively searched, to thereby extract a leaf to be searched from a node which agrees with or is included in the spatial search conditions (Step 1302); a pertinent geometry is obtained from the leaf (Step 1303); the obtained geometries are separately compared with the spatial search conditions (it is determined whether or not the pertinent geometry agrees with the spatial search region conditions) (Step 1304); and if the geometry agrees with the conditions, the pertinent geometry is output as a searched result (Step 1305). Next, it is determined whether or not another geometry is present in the pertinent leaf (Step 1306), and if there is a geometry, the procedure returns to Step 1303. When a processing with geometries in the leaf is finished, it is determined whether or not another leaf to be searched is present (Step 1307), and if there is a leaf to be searched, the procedure returns to Step 1302. With such a processing, a geometry present in the target spatial region can be searched at high speed, from among geometries distributed in the space.

With a use of the spatial search index, a search in a spatial region as shown in FIG. 9 can be performed. FIG. 9 shows a searched result for all landmarks within a circle (902) having a certain radius, taking a coordinate (901) of Tokyo station as a center. Landmarks (903) outside the spatial region are not searched, and only landmarks (904) inside the spatial region are searched. In this case, searched landmarks include B restaurant Kanda branch, Y Bank Otemachi branch and X Bank Yurakucho branch.

Such a technique is disclosed in Japanese patent No. 3649430 (Japanese unexamined patent application Kokai No. 2001-14338).

One common application of the RDBMS having the above-mentioned spatial search function is a search under combined conditions of "spatial search conditions" and "other refining conditions". Examples of the spatial search conditions combined with additional conditions include "gas station along a route" in a field of car navigation, "condominium with 3 bed rooms or more located within a 1-kilometer radius of a station" in a real estate search system, "rival store within a 2-kilometer radius of an existing store" in a local area marketing field.

As one advanced search, there can be mentioned a search under combined conditions of spatial search conditions with attribute conditions (see FIG. 10). FIG. 10 shows a searched result for landmarks tagged with "bank" category, from among landmarks located within a circle (1002) having a certain radius, taking a coordinate (1001) of Tokyo station as a center. As in FIG. 9 that shows a processing result of a general spatial search, landmarks (1003) outside the spatial region are not searched. In addition to this, landmarks (1004) inside the spatial region having attributes that do not agree with conditions are not searched. In other words, only landmarks (1005) inside the spatial region having attributes (also referred to as 'attribute information') that agree with the conditions are searched. In this embodiment, B restaurant Kanda branch is located within a circle of the search, but the attribute condition is not bank, and therefore B restaurant Kanda branch is not a targeted landmark. Only Y Bank Otemachi branch and X Bank Yurakucho branch are included in the searched result.

If a conventional RDBMS is used, this search may be performed by adding an attribute column to an existing spatial data column, connecting a plurality of search conditions via AND condition of SQL, and merging and outputting searched result in the RDBMS. In this case, the spatial search alone is not useful for refining the search, since the additional conditions remarkably refines the search. However, high performance is not expected if the searches are separately performed. Moreover, such conditions are frequently used, and thus a search processing takes time. As a result, technique to perform a search processing at high speed has been desired.

Therefore, it would be desirable to provide a technique to perform a spatial search processing at high speed, by including additional information as hint for combined conditions in a spatial search index, to thereby search additional information during the search of the spatial search index.

SUMMARY OF THE INVENTION

In an aspect of the present invention, there is provided a method for processing data performed in a data processing system having a storage unit, including: creating a spatial index having a tree structure comprising a leaf containing location information and attribute information with respect to a plurality of objects to be searched, and storing the spatial index in the storage unit; and referring to the spatial index stored in the storage unit in response to an input of a search request including location information and attribute information for searching the object to be searched, and extracting the object to be searched that agrees with the search request.

In another aspect of the present invention, there is provided a data processing system having a storage unit, including: a means for creating a spatial index having a tree structure comprising a leaf containing location information and attribute information with respect to a plurality of objects to be searched, and storing the spatial index in the storage unit; and a means for referring to the spatial index stored in the storage unit in response to an input of a search request including location information and attribute information for searching the object to be searched, and extracting the object to be searched that agrees with the search request.

In still another aspect of the present invention, there is provided a data processing program for making a data processing system having a storage unit perform following steps including: creating a spatial index having a tree structure comprising a leaf containing location information and attribute information with respect to a plurality of objects to be searched, and storing the spatial index in the storage unit; and referring to the spatial index stored in the storage unit in response to an input of a search request including location information and attribute information for searching the object to be searched, and extracting the object to be searched that agrees with the search request.

According to the present invention, a spatial search index (also referred to as 'spatial index') is extended so as to store at least one attribute condition (additional information), in addition to spatial information.

In the conventional spatial search index, when 2-dimensional data is processed, space division is performed by using a combination of an x-coordinate and a y-coordinate, and storing the information as an index. With this configuration, spatial conditions can be refined upon a spatial search by referring to the index. When the search is performed under combined conditions of spatial search conditions and subsidiary attribute conditions, after refining with the spatial search, a determination is made by using attribute information stored in other column, or by merging the searched result with the index search result allocated to other column, to thereby output only a result contained in both searches.

Here, if hint information for attribute conditions is stored in the spatial search index, refining can be made also with respect to attribute conditions, when refining is made with respect to the spatial search. For attribute conditions stored in the spatial, search index, subsidiary attributes may be used without any conversion and stored as key words, numerical values or the like. However, in order to avoid forming a large index, subsidiary attributes may be classified according to items or genres, and the obtained category information may be stored as hint information in a form of bit array, to thereby search a record that agrees with a specific bit condition from the bit array.

In addition, by adding z-axis information as attribute conditions to a 2-dimensional spatial search index, and implementing a region search also with the subsidiary attribute conditions, a 3-dimensional search can be performed with the 2-dimensional spatial search index.

According to the present invention, by including additional information as hint for combined conditions in the spatial search index, additional information is also searched upon a search of the spatial search index, and therefore a spatial search processing at high speed can be realized.

BRIEF DESCRIPTION OF THE DRAWINGS

The various aspects, other advantages and further features of the present invention will become more apparent by describing in detail illustrative, non-limiting embodiments thereof with reference to the accompanying drawings.

DETAILED DESCRIPTION OF THE EXEMPLARY EMBODIMENTS

Embodiments of the present invention will be described below in detail with reference to the accompanying drawings. It should not be construed that the present invention is limited to these embodiments. The term "means" used herein specifically denotes, for example, unit or module that executes a certain function.

Hereinafter, one embodiment of a spatial search system of the present invention will be explained.

Figure 1:
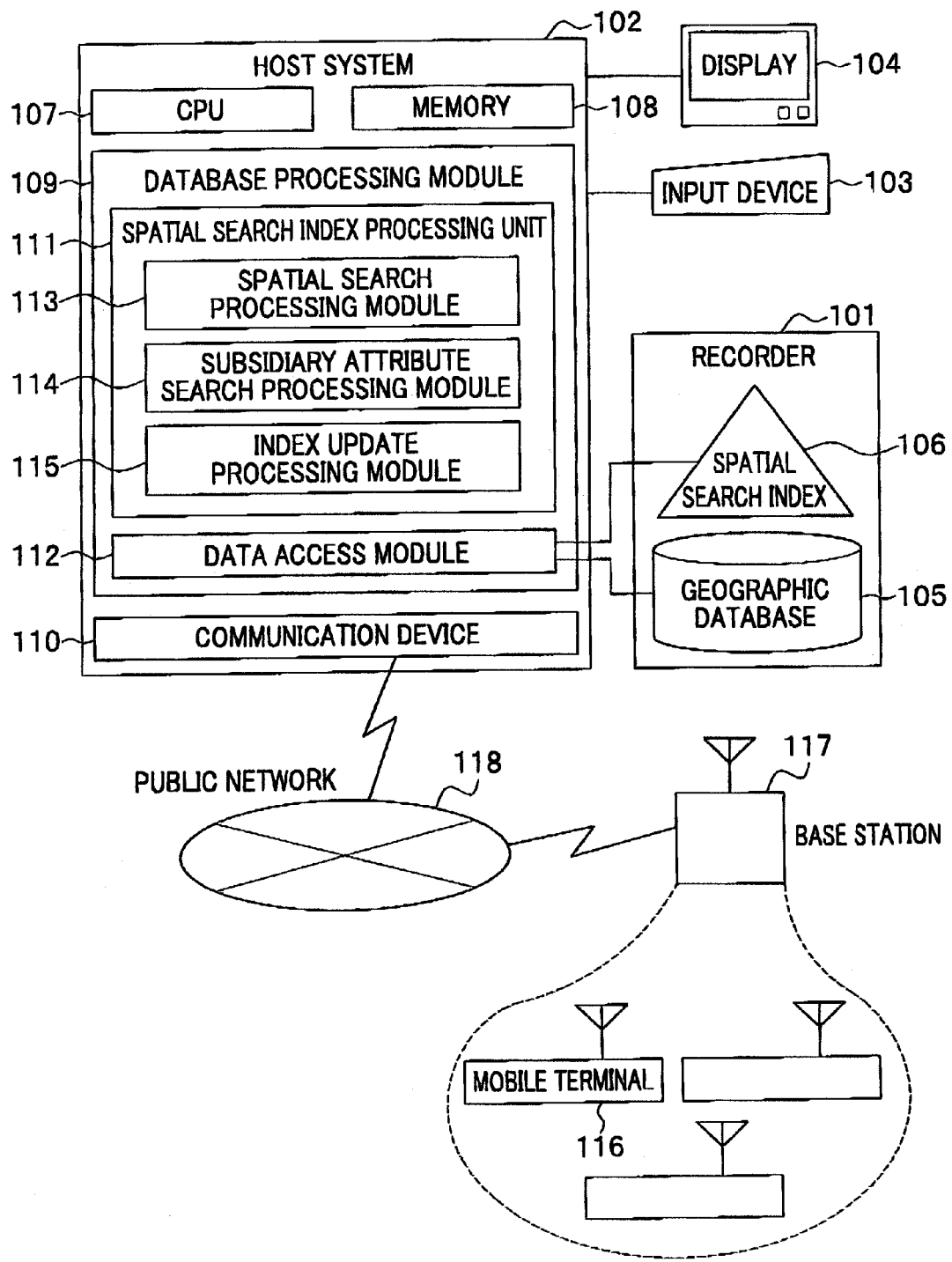
FIG. 1 is a system configuration diagram showing one embodiment (host system) of the present invention.

FIG. 1 is a system configuration diagram showing one embodiment of the present invention, which includes a host system (data processing system) and a communication terminal.

A spatial search system of the present invention includes: a recorder (storage unit) 101 for storing map; a host system 102 for performing a search processing; an input device 103 for inputting an instruction from a user; and a display 104 for showing results and states. For the host system 102, a computer or an information processing system may be used.

The recorder 101 includes a geographic database 105 for storing map data, and a spatial search index 106 (also referred to as "spatial index") for speeding up a spatial search.

The host system 102 includes: a CPU 107 for performing an arithmetic processing; a memory 108 for storing module (program) or data; a database processing module 109 for accessing the recorder 101 in response to a search request; and a communication device 110 for delivering a result of a search processing.

The database processing module (data processing program) 109 includes: a spatial search index processing unit 111 for processing a search request (that may include search conditions), an update request, an addition request and a deletion request with respect to space coordinate data (also referred to as 'location information') and subsidiary attribute data (also referred to as 'attribute information') thereof; and a data access module 112 for accessing the recorder 101. While a general database processing module may further include other modules for processing a search request and an update request, they are omitted in FIG. 1.

The spatial search index processing unit 111 includes: a spatial search processing module 113 for performing a search processing using space coordinates; a subsidiary attribute search processing module 114 for performing a search processing of subsidiary attributes; and an index update processing module 115 used in response to an update request.

The spatial search index processing unit 111 is configured to select necessary data (data that agrees with the search request) at high speed from among data stored in the geographic database 105, using the spatial search index 106 under combined conditions of spatial search conditions and attribute conditions.

The index update processing module 115 is configured to update the spatial search index 106 by synchronizing with the geographic database 105, upon receiving an update request of space coordinate data and subsidiary attribute data thereof.

A mobile terminal 116 configured to receive map data and map-associated data from the host system 102 is communicative with, a base station 117 through wireless network. The base station 117 is connected to a public network 118 which is a wired public network, to which the host system 102 is connected. Therefore, the mobile terminal 116 and the host system 102 are connected to (communicative with) each other through wireless network via the base station 117 and the public network 118.

Figure 2:
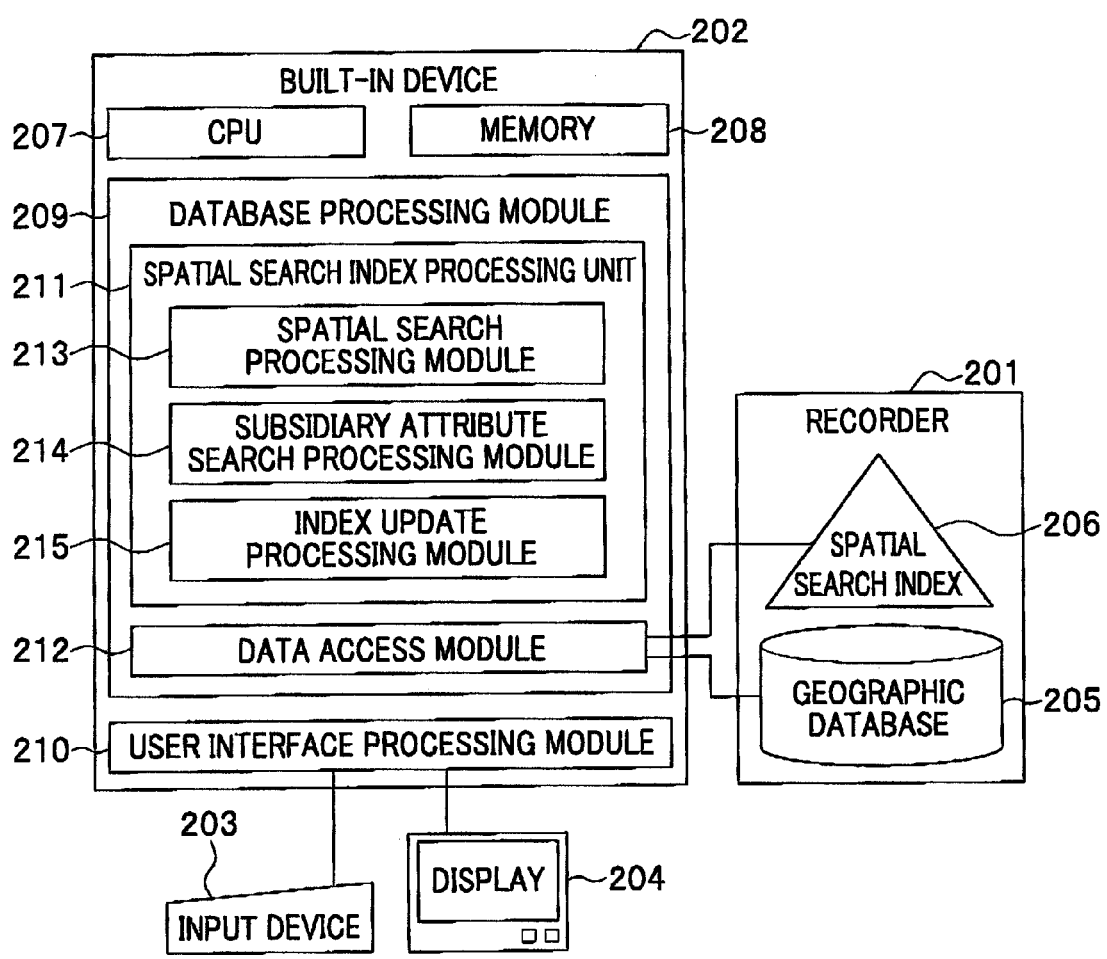
FIG. 2 is a system configuration diagram showing another embodiment (built-in device) of the present invention.

FIG. 2 is a system configuration showing another embodiment of the present invention formed as a built-in device. The spatial search system includes: a recorder 201 for storing map; a built-in device 202 for performing a search processing; an input device 203 for inputting an instruction from a user; and a display 204 for showing results and states.

The recorder 201 includes a geographic database 205 for storing map data, and a spatial search index 206 for speeding up a spatial search.

The built-in device 202 includes: a CPU 207 for performing a processing to execute a module; a memory 208 for storing module (program) or data; a database processing module 209 for accessing the recorder 201 in response to a search request inputted (or received); and a user interface processing module 210 for managing input by user and map or state display to user. These processing units and modules may be realized by, for example, program, object, process or thread. Alternatively, these processing units and modules may be realized by hardware. The built-in device may be a map search system, a navigation system or a car navigation system.

Like in FIG. 1, the database processing module 209 includes: a spatial search index processing unit 211 for processing a search request and an update request with respect to space coordinate data and subsidiary attribute data thereof; a data access module 212 for accessing the recorder 201. While a general database processing module may further include other modules for processing a search request and an update request, they are omitted in FIG. 2.

The spatial search index processing unit 211 includes: a spatial search processing module 213 for performing a search processing using space coordinates; a subsidiary attribute search processing module 214 for performing a search processing of subsidiary attributes; and an index update processing module 215 used in response to an update request.

The spatial search index processing unit 211 is configured to select necessary data at high speed from among data stored in the geographic database 205, using the spatial search index 206 under combined conditions of spatial search conditions and attribute conditions.

The index update processing module 215 is configured to update the spatial search index 206 by synchronizing with the geographic database 205, upon receiving an update request of space coordinate data and subsidiary attribute data thereof. If the built-in device does not have an updating function due to its configuration, the index update processing module 215 may be omitted.

Figure 3:
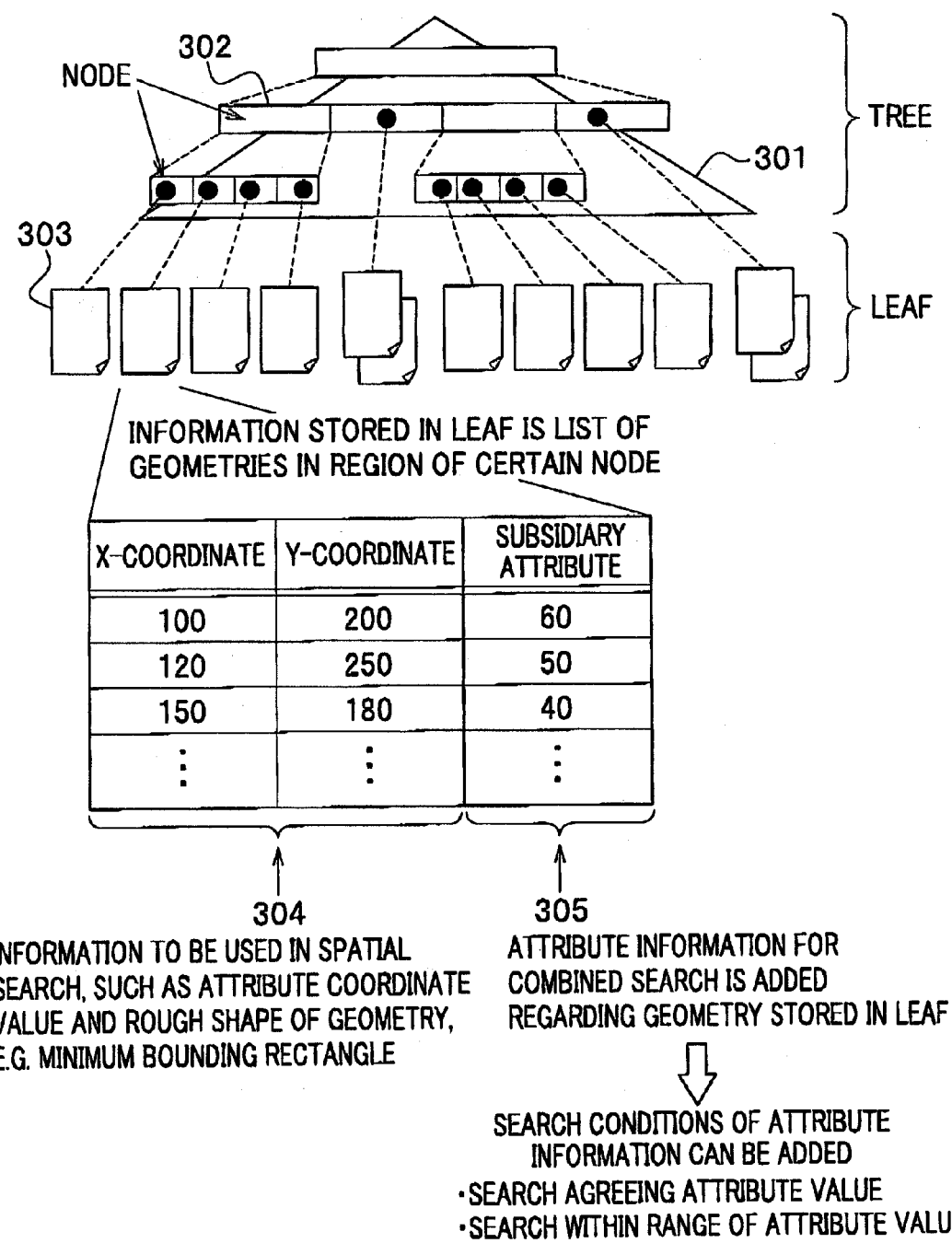
FIG. 3 is one example of data structure of a spatial search index (attribute value).
Figure 4:
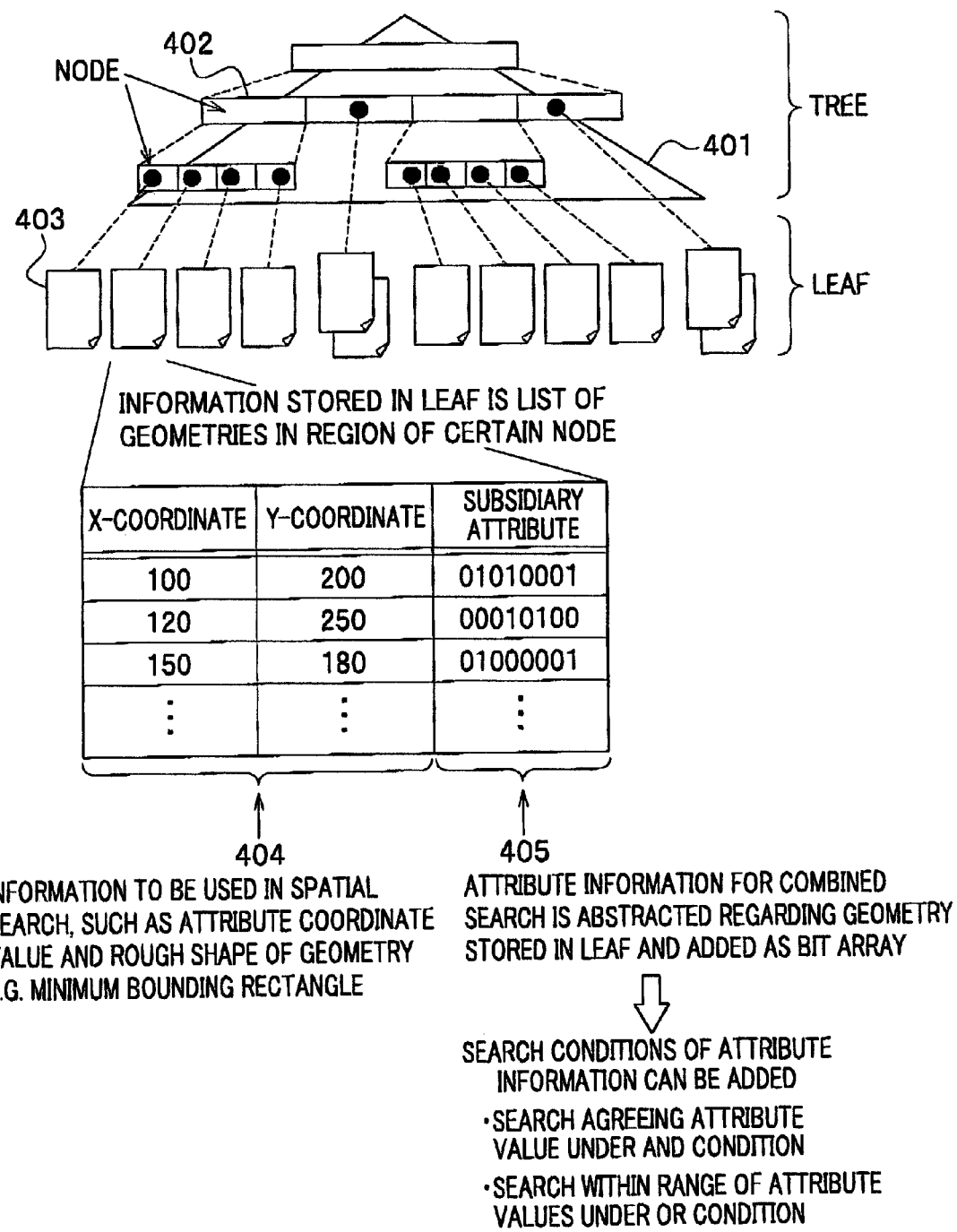
FIG. 4 is another example of data structure of a spatial search index (bit array of abstracted attribute).

Each of the spatial search index 106 in FIG. 1 and the spatial search index 206 in FIG. 2 stores subsidiary attributes, in addition to space coordinate data stored in corresponding geographic database 105, 205. The data structure is shown in FIGS. 3 and 4. Division states of space are shown by a tree structure (301, 401), and individual elements contained therein is called a node (302, 402). Each node has at least one leaf (303, 403) as a region for storing data list to be managed by the node. Depending on the tree structure, a node may not have leaves.

In the data list of the leaf, geometry regions each for an individual geometry are stored, and referred to when a search is performed. In the embodiment of the present invention, in the data list of the leaf, a subsidiary attribute (additive attribute) (305, 405) is added to the geometry regions each for an individual geometry (304, 404). The drawing illustrates a case where one subsidiary attribute (additive attribute) is added to a combination of an x-coordinate and a y-coordinate. As for a coordinate region to be used for a search, a rough shape of a geometry, such as a minimum bounding rectangle, is often used, in addition to the one point coordinate illustrated in the drawing. Though the attribute to be added in the present embodiment illustrated is single, a plurality of attributes may be added.

Figure 5:
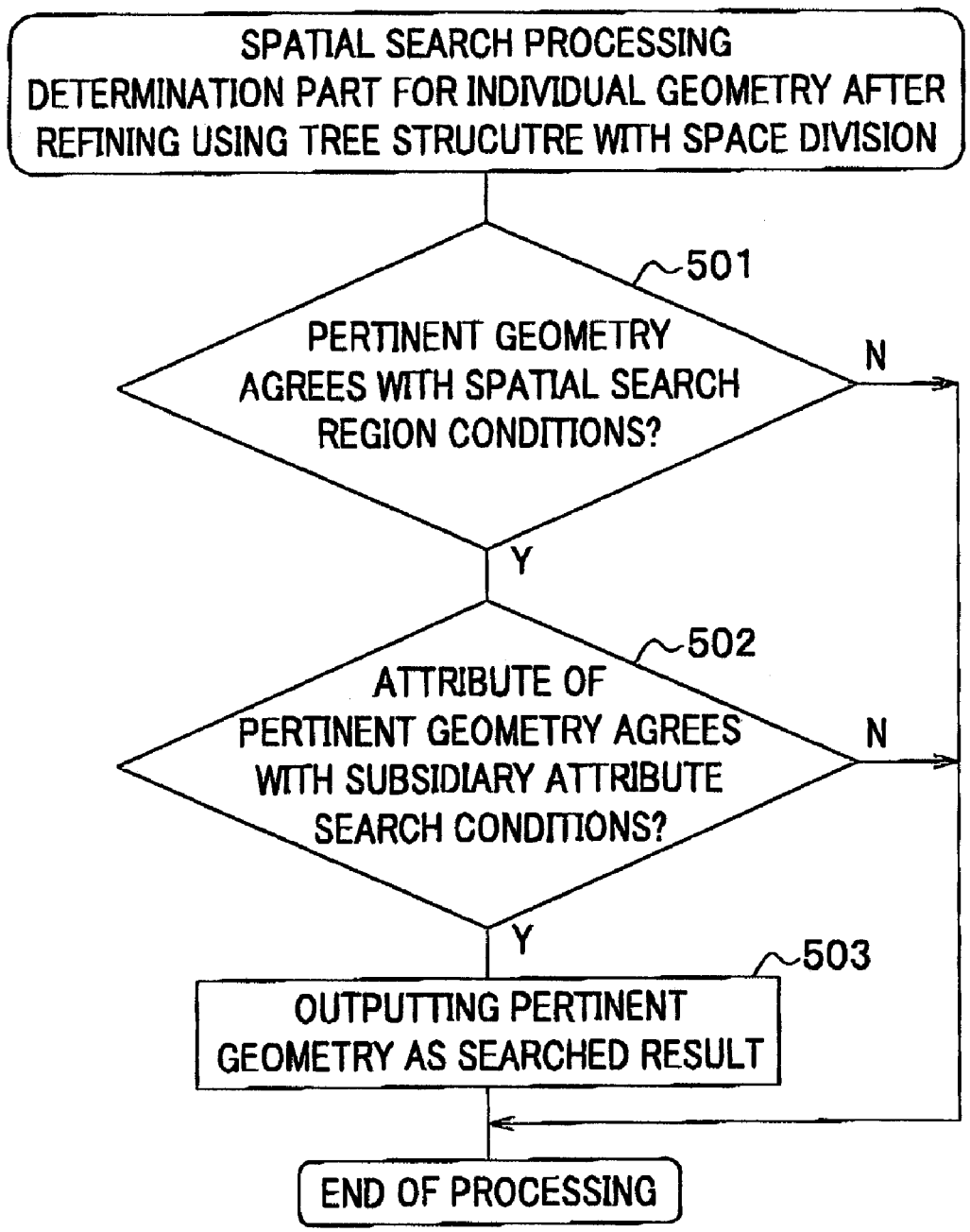
FIG. 5 is a flowchart of a general outline of a spatial search processing.
Figure 13:
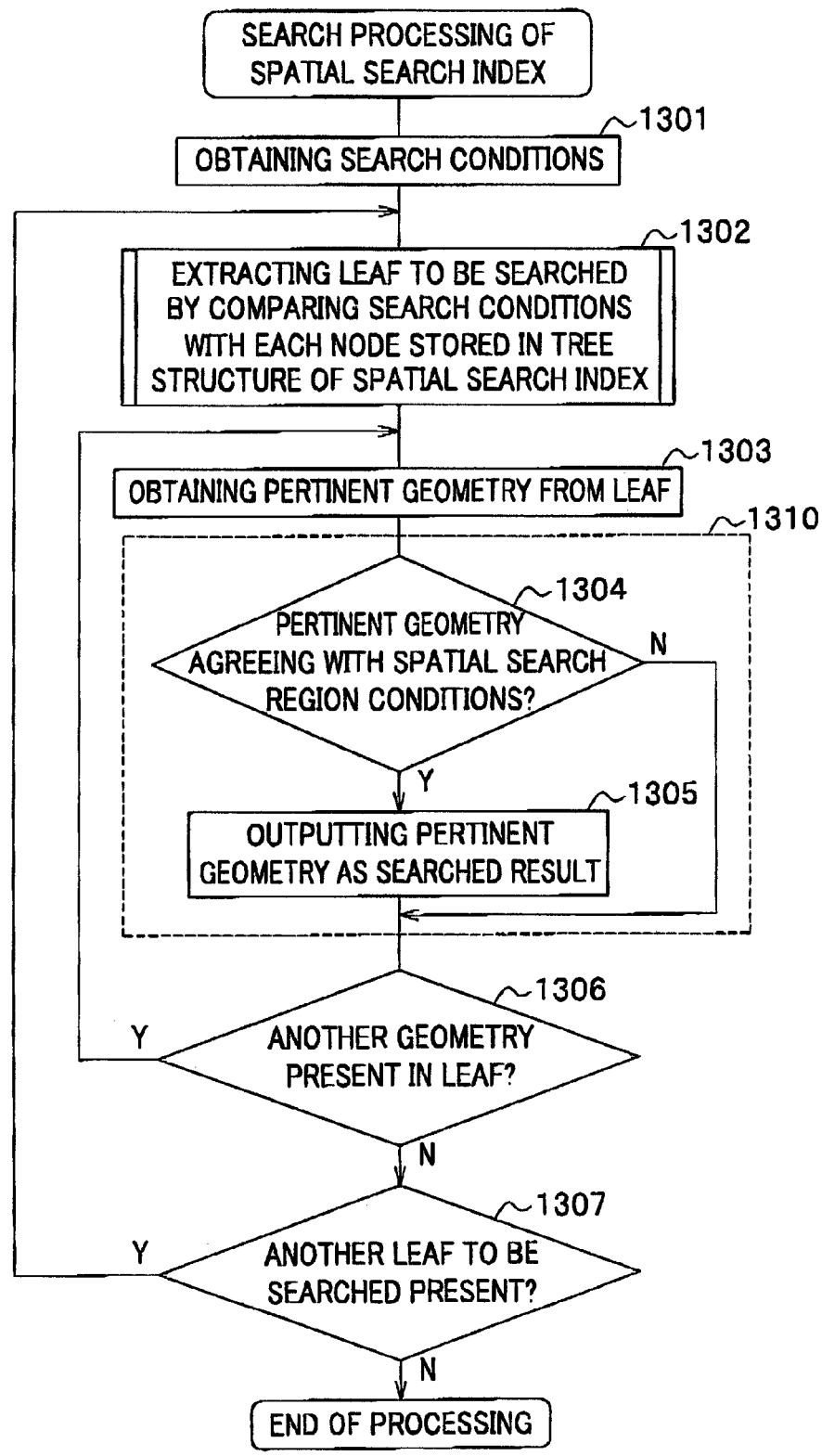
FIG. 13 is a flowchart of a general spatial search processing using a spatial search index.

In the present embodiment, a search is performed under subsidiary attribute search conditions as well as spatial search conditions, using the subsidiary attribute (additive attribute). FIG. 5 shows a flowchart of a general outline of the search processing. The flowchart in FIG. 5 is a substitute for the processing flow indicated with a dotted frame 1310 in FIG. 13.

First, by determining whether or not a pertinent geometry agrees with spatial search region conditions with referring to a spatial search index with the designated spatial search conditions, candidates are refined (Step 501). If the pertinent geometry agrees with the spatial search region conditions, from the spatial search index, a value of subsidiary attribute added to a record of a candidate refined by the spatial search is obtained. By comparing the obtained value with a subsidiary attribute search condition, it is determined whether or not the attribute of the pertinent geometry agrees with the subsidiary attribute search condition (Step 502). If the attribute of the pertinent geometry agrees with the subsidiary attribute search condition, the pertinent geometry is output as a searched result (Step 503).

It should be noted that the processing in Step 501 is performed by the spatial search processing module 113 (213), and the processing in Step 502 is performed by the subsidiary attribute search processing module 114 (214).

Figure 7:
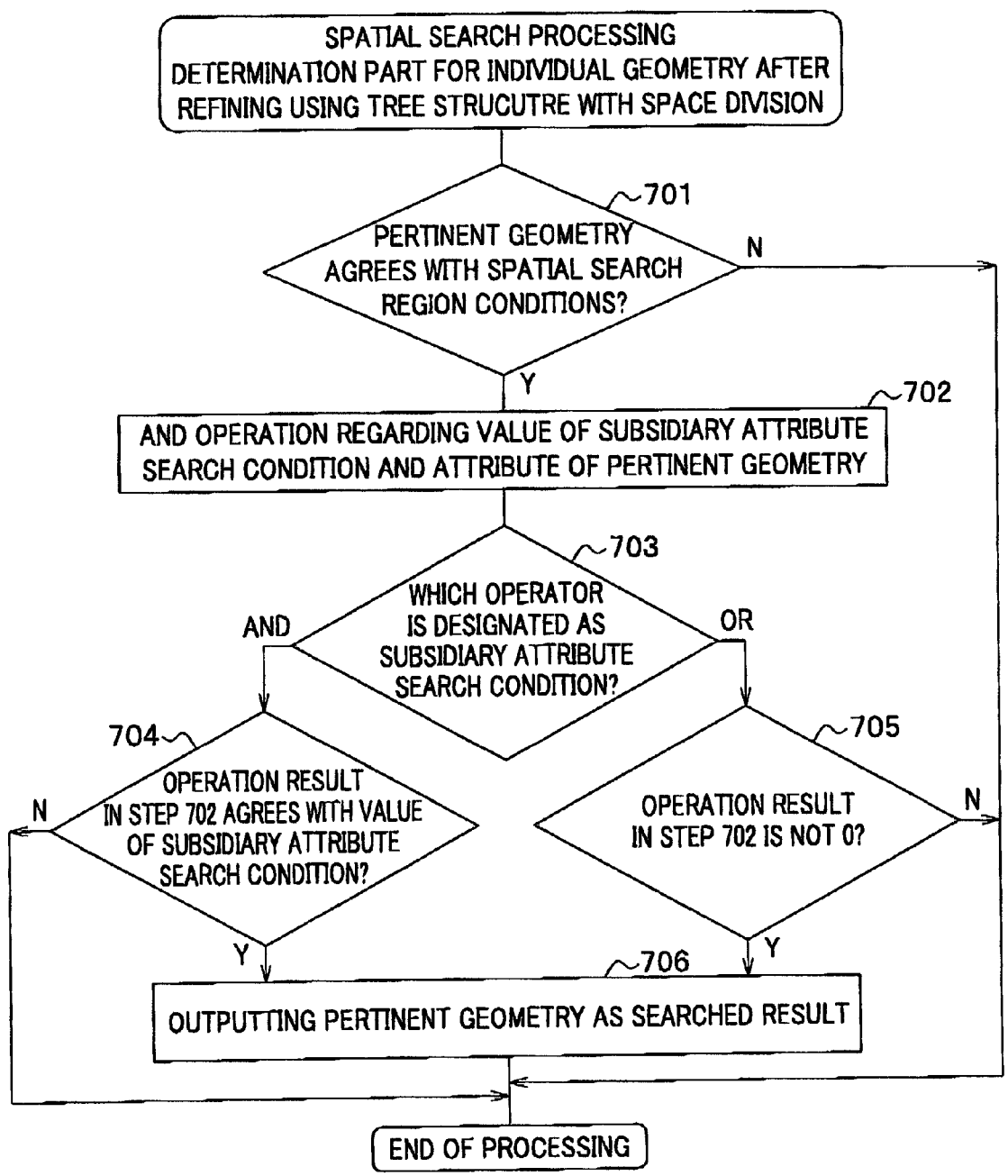
FIG. 7 is a flowchart of a processing part of subsidiary attribute search conditions (bit operation determination conditions).
Figure 8:
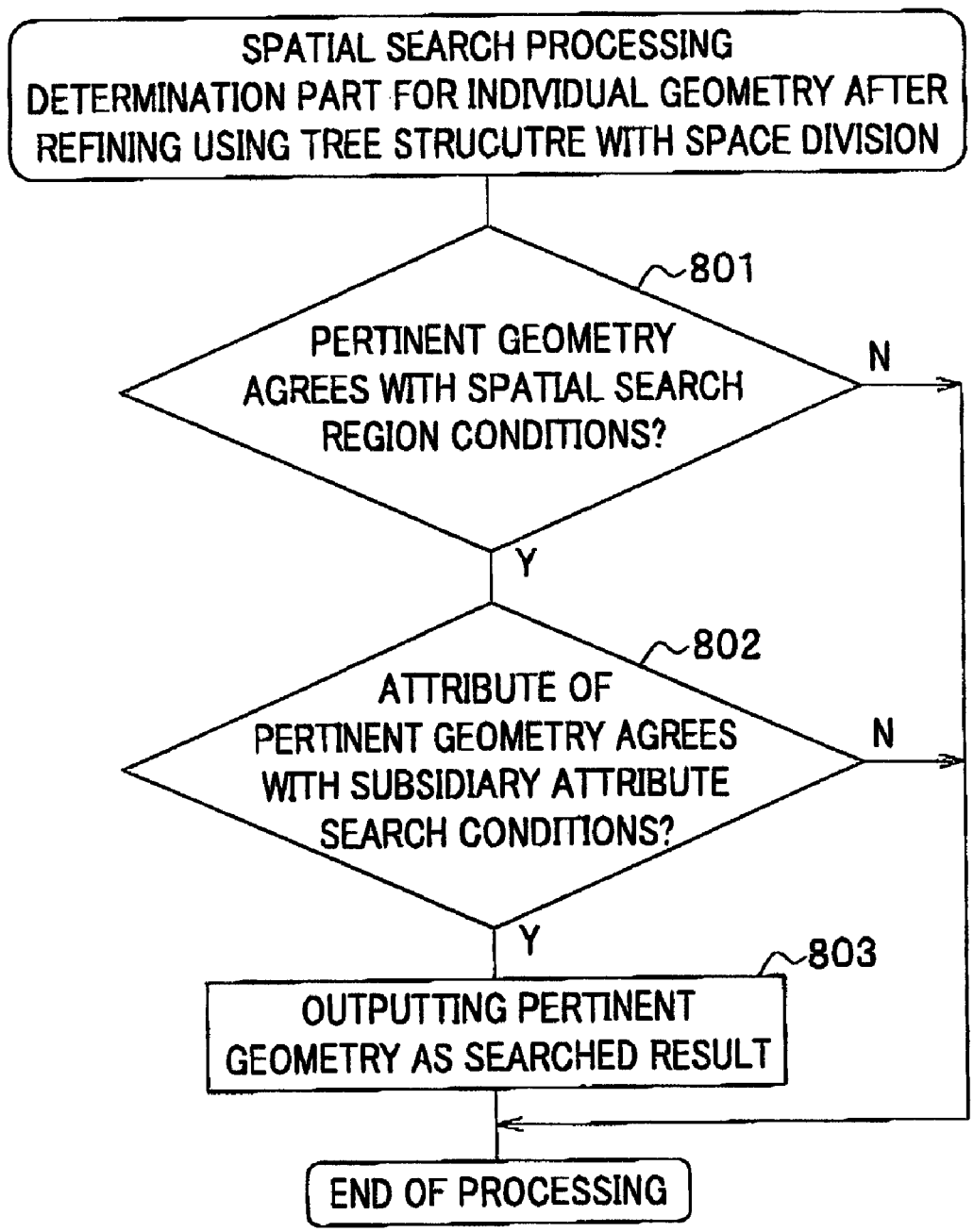
FIG. 8 is a flowchart of a processing part of subsidiary attribute search conditions (range comparison conditions).
Figure 9:
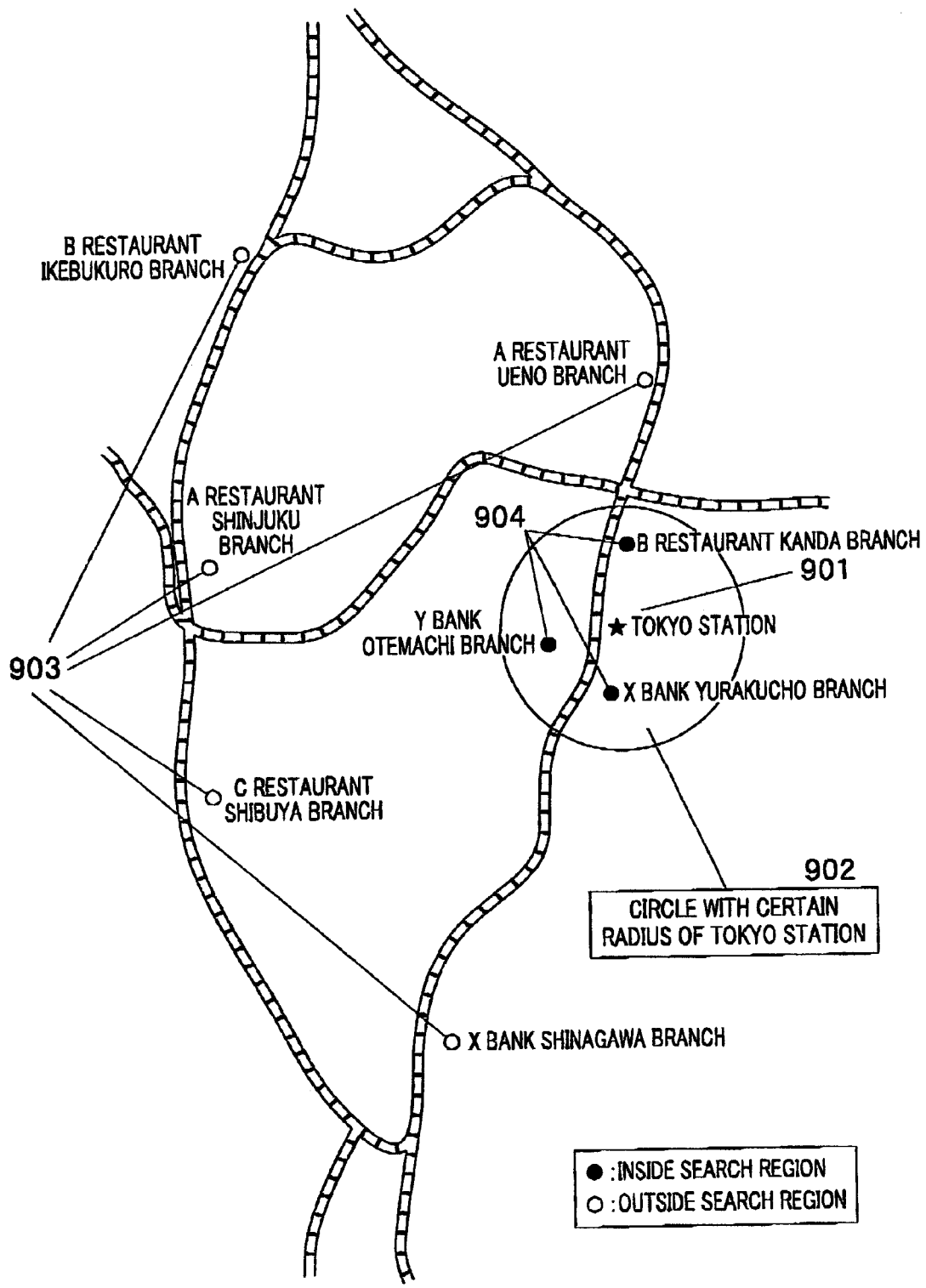
FIG. 9 is one example of a processing result of a general spatial search (spatial search only).
Figure 10:
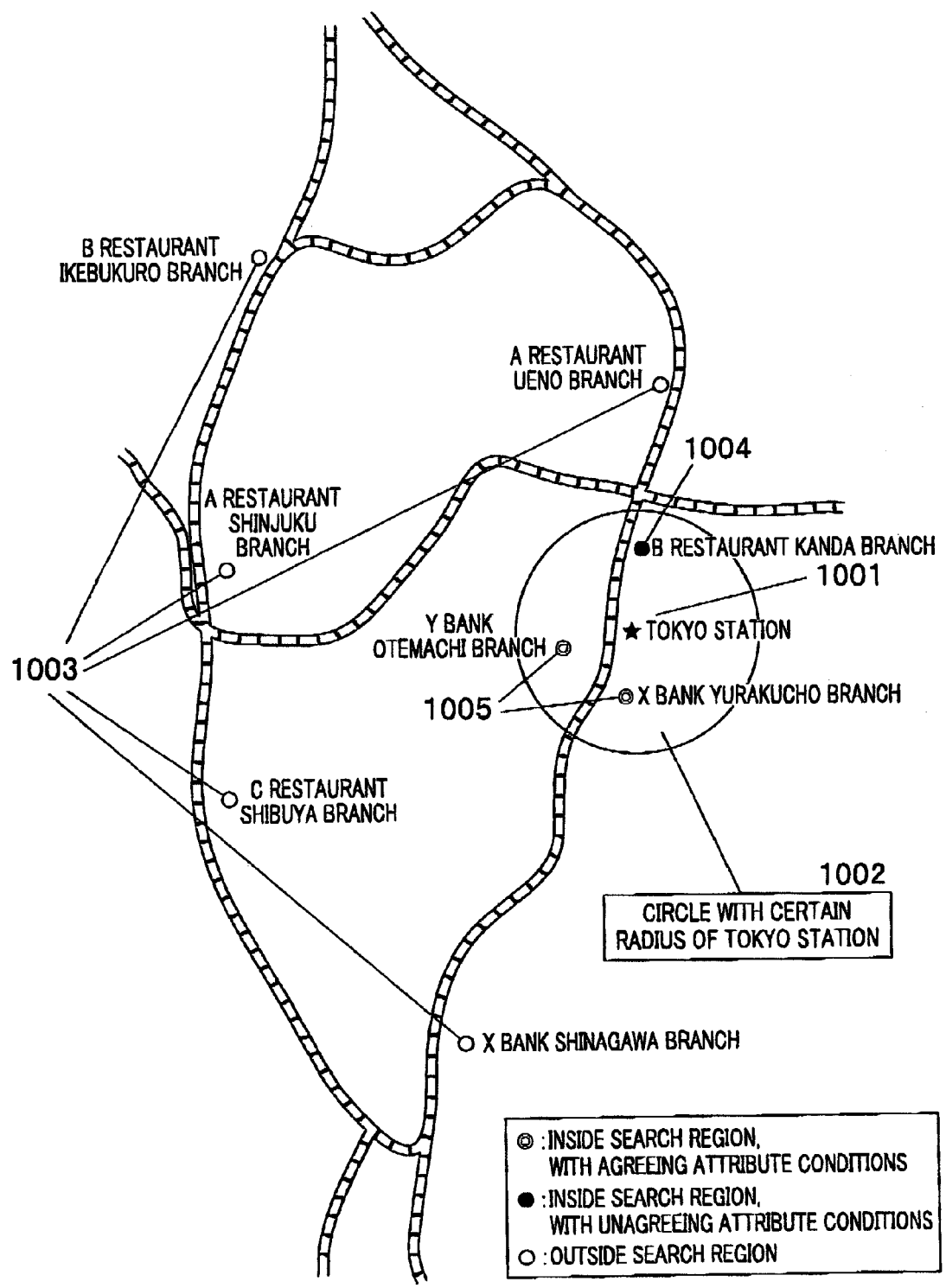
FIG. 10 is one embodiment of a processing result of the present invention (spatial search+attribute search).
Figure 11:
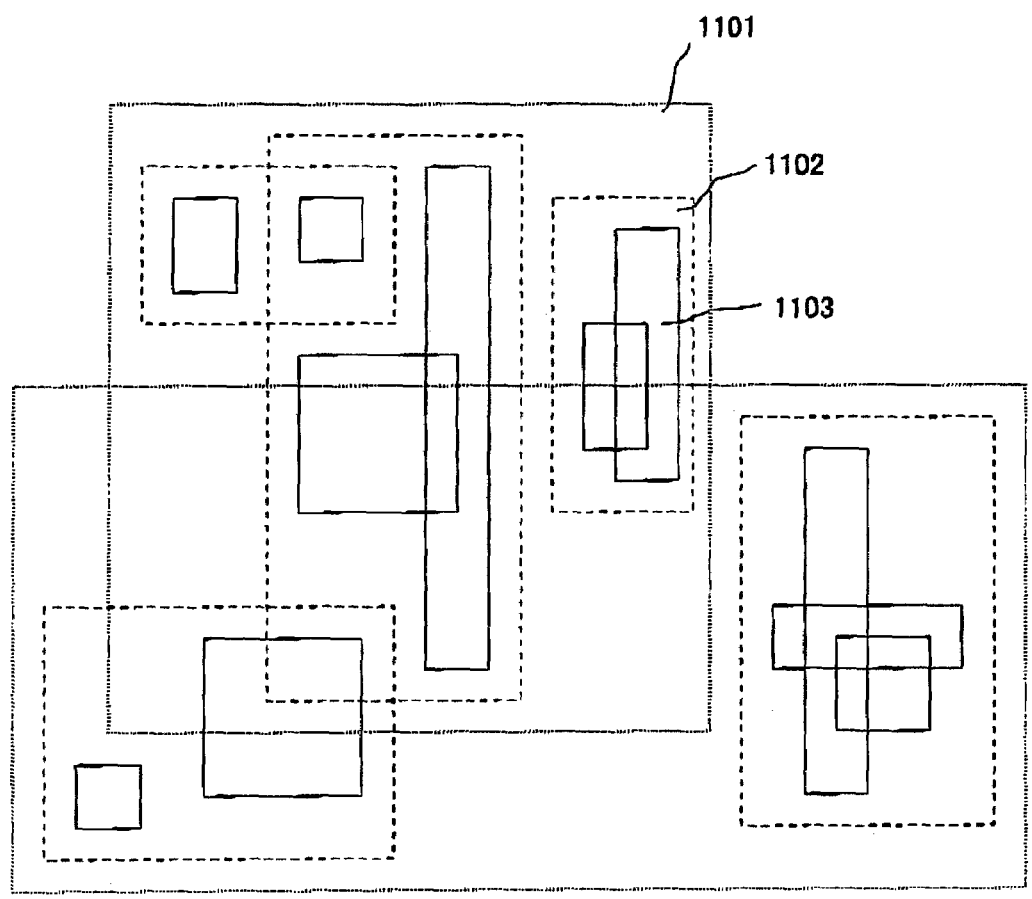
FIG. 11 is one example of space division of a spatial search index (R-tree).
Figure 12:
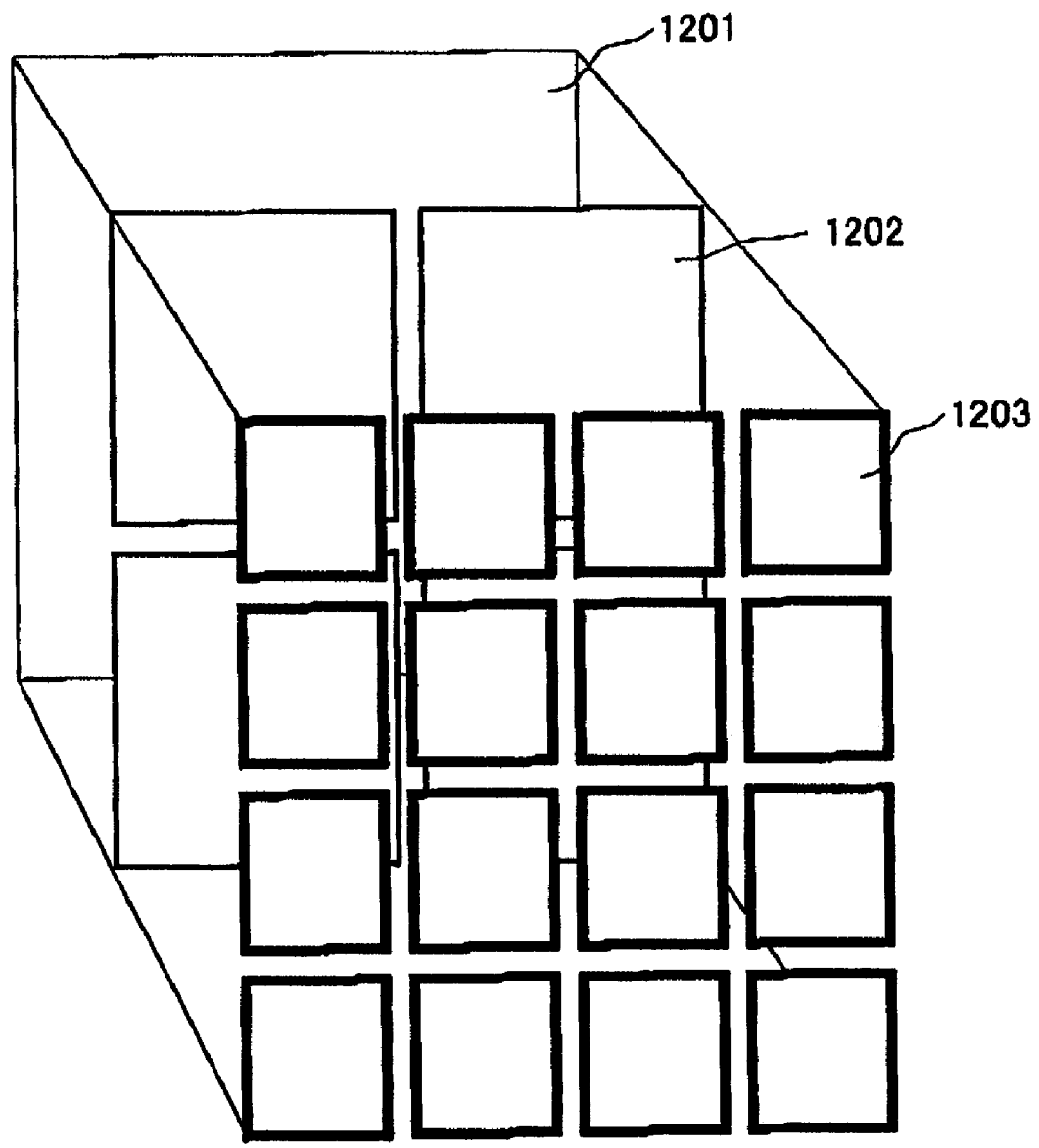
FIG. 12 is another example of space division of a spatial search index (quad-tree).

For the subsidiary attribute search condition to be used for a determination in Step 502, conditions of value agreement, range comparison or bit operation determination Carl be designated. A flowchart of each processing is shown in corresponding FIGS. 6-8. Like in FIG. 5, the flowchart in each of FIGS. 6-8 is a substitute for the processing flow indicated with a dotted frame 1310 in FIG. 13.

Figure 6:
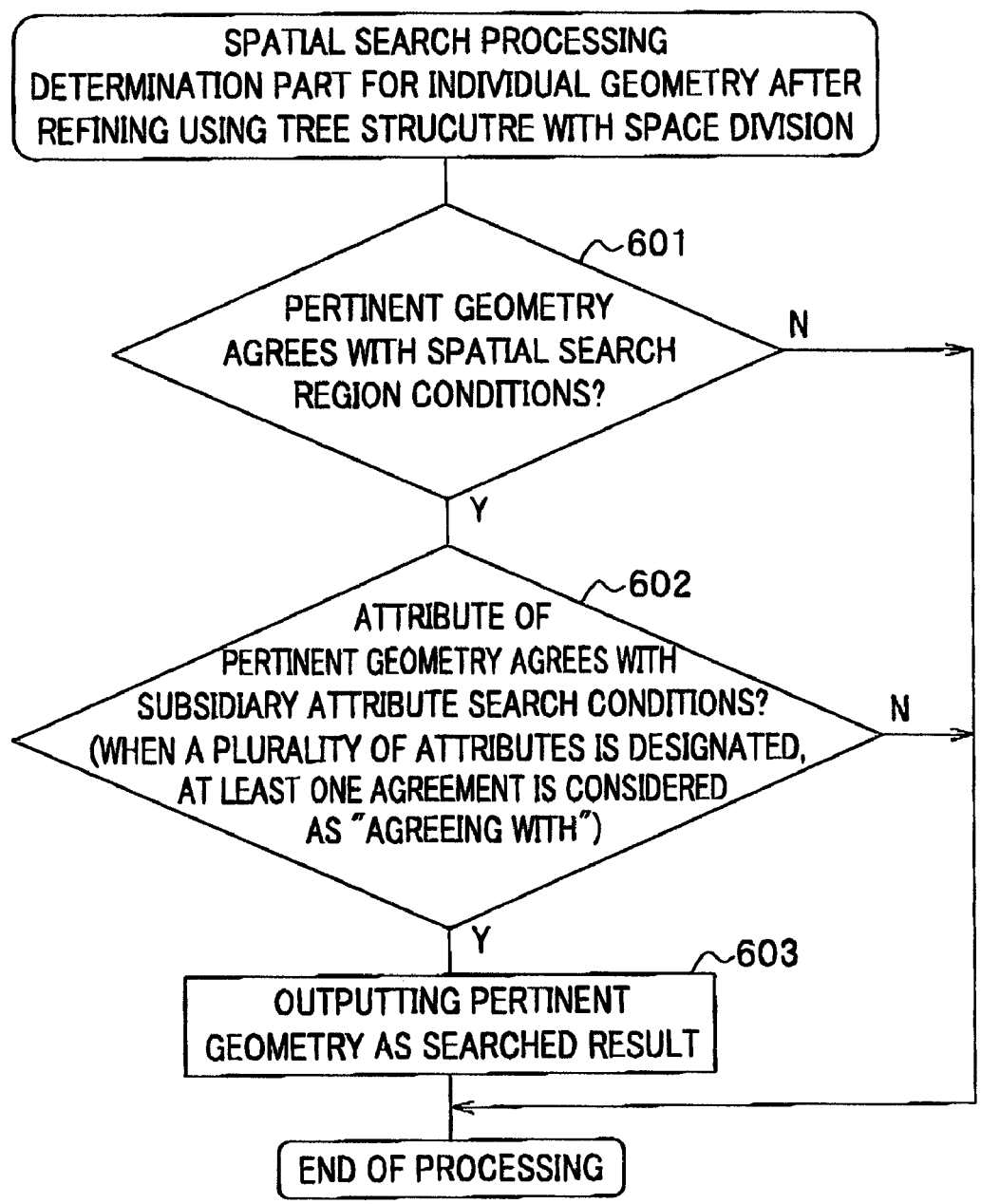
FIG. 6 is a flowchart of a processing part of subsidiary attribute search conditions (value agreement conditions).

In a determination of value agreement in FIG. 6, at least one value can be designated as the subsidiary attribute search condition.

First, by determining whether or not a pertinent geometry agrees with spatial search region conditions under the designated spatial search conditions, candidates are refined (Step 601). If the pertinent geometry agrees with the spatial search region conditions, a value of subsidiary condition added to a candidate is obtained. By comparing the obtained value with the value designated as a subsidiary attribute search condition, it is determined whether or not the attribute of the pertinent geometry agrees with the subsidiary attribute search condition (Step 602). If the attribute of the pertinent geometry agrees with the subsidiary attribute search condition, the pertinent geometry is output as a searched result (Step 603). Herein, if a plurality of values is designated as subsidiary attribute search conditions, in Step 602, the attribute is considered as "agreeing with" when at least one value agrees with as a result of comparison with a plurality of values. In order to accomplish this type of determination, for example, category values are stored as subsidiary attribute, and used when searched under subsidiary search condition, such as "agreeing with a specified category". Examples of data structure in this case include FIG. 3. For example, category information of landmark is stored as a subsidiary attribute (305) in FIG. 3. Specifically, categories, such as gas station and convenience store, are converted into numerical terms as category ID and stored, and when a subsidiary attribute condition, such as "category ID agrees with 50", is added, a record with agreeing category ID is exclusively extracted among from those with agreeing spatial search condition. A plurality of search conditions can be designated for agreement, such as "category ID agrees with 50 or 60".

It should be noted that the processing in Step 601 is performed by the spatial search processing module 113 (213), and the processing in Step 602 is performed by the subsidiary attribute search processing module 114 (214).

For bit operation determination conditions in FIG. 7, bit operators, such as AND and OR, and bit operation value can be designated as subsidiary attribute search conditions.

First, by determining whether or not a pertinent geometry agrees with spatial search region conditions under the designated spatial search conditions, candidates are refined (Step 701). If the pertinent geometry agrees with the spatial search region conditions, AND operation is performed with respect to a value designated as the subsidiary attribute search condition and a value of the subsidiary condition (attribute of pertinent geometry) added to the refined candidates (Step 702).

Then, a determination is performed according to the operator designated as the subsidiary attribute search condition (Step 703). If AND operator is designated, it is determined whether or not all of necessary bits agrees with (i.e., it is determined whether or not the operation result of Step 702 agrees with a value of the subsidiary attribute search condition) (Step 704). If OR operator is designated, it is determined whether or not at least one bit agrees with (i.e., it is determined whether or not the operation result of Step 702 is not 0) (Step 705). When the bit agrees with under the above-mentioned conditions, the pertinent geometry is output as a searched result (Step 706).

In order to accomplish this type of determination, for example, category values are stored as subsidiary attribute. In a case where category expressed as literal leads to a short of conditions, the subsidiary attributes are categorized by genre and the like, the result of categorization is abstracted and expressed in a form of bit array, necessary bit is allocated, and used when searched with a single bit operation under subsidiary search condition, such as "agreeing with a specified category".

In addition, the number of pieces of information that forms a bit array is not single, and bits are allocated to a plurality of attribute data, to thereby perform a search processing at one time under a plurality of attribute search conditions. Examples of the data structure include those shown in FIG. 4. For example, with respect to the subsidiary attribute (405) in FIG. 4, category information of landmark and other information are abstracted and stored in a form of a bit array.

Specifically, if a bit to be 1 for "bank" is allocated at a low-order 7th bit (01000000) and a bit to be 1 for "restaurant" is allocated at a low-order 3rd bit (00000100), and a subsidiary attribute condition of "AND condition is established between subsidiary attribute information and a bit array of 01000000" is added, a record having a bit condition with agreeing subsidiary attribute is exclusively extracted from among those with agreeing spatial search conditions. As for this bit condition, additional information totally different from one another, such as "bit representing a place of night business", "bit representing a place with parking lot" and "bit representing a place with lavatory available" can be allocated in the bit array. With this configuration, a search can be performed under AND condition in which designated bits agree with at the same time, or OR condition in which at least one bit agrees with, as a subsidiary attribute condition.

It should be noted that the processing in Step 701 is performed by the spatial search processing module 113 (213), and the processing in Step 702 is performed by the subsidiary attribute search processing module 114 (214).

In a determination of range comparison in FIG. 8, a value range can be designated as a subsidiary attribute search condition.

First, by determining whether or not a pertinent geometry agrees with spatial search region conditions under the designated spatial search conditions, candidates are refined (Step 801). If the pertinent geometry agrees with the spatial search conditions, a value of subsidiary condition added to a candidate is obtained. By determining whether or not the obtained value is included in the value range designated as the subsidiary attribute search condition, it is determined whether or not the attribute of the pertinent geometry is included in the region of the subsidiary attribute search conditions (Step 802). If the attribute of the pertinent geometry is included in the region, the pertinent geometry is output as a searched result (Step 803). In order to accomplish this type of determination, for example, a value of a z-coordinate is stored as a subsidiary attribute, and used when 3-dimensionally searched in which a search region of z-axis is added to the spatial search conditions. In this case, examples of the data structure include those shown in FIG. 3. For example, when a value of a z-axis as height information is stored as a subsidiary attribute (305) in FIG. 3, by adding subsidiary attribute condition of "value of a z-axis is in a range of 40-50", a record having a value of the z-axis agreeing with the certain range is exclusively extracted from among those with agreeing spatial search conditions.

In this manner, by storing the hint information for the subsidiary conditions in the spatial search index of geographic database, and appropriately utilizing the information in a search processing, a search under combined conditions of spatial search conditions and subsidiary conditions can be performed at high speed only with accessing to the spatial search index, but without merging a plurality of searched results by DBMS.

It should be noted that the processing in Step 801 is performed by the spatial, search processing module 113 (213), and the processing in Step 802 is performed by the subsidiary attribute search processing module 114 (214).

According to the above, under the combined search conditions of spatial search conditions and subsidiary attribute conditions, an attribute search can be performed together with a spatial search, without separately refining results of a primary search, or without merging results searched under a plurality of conditions, unlike the conventional RDBMS. Though the subsidiary attribute data may be stored in a spatial search index without any conversion, a spatial search index can be made compact by classifying the subsidiary attribute data according to items or genres and storing the obtained category information in a form of bit array. At the same time, by introducing bit operation, a determination under a plurality of additional conditions can be made only with a single operation.

In addition, by adding z-axis information as subsidiary attribute data to a 2-dimensional spatial search index, and implementing a region search also with subsidiary attribute conditions, a 3-dimensional search can be performed with the 2-dimensional spatial search index. In other words, by creating an n-dimensional spatial search index including (n+1)-dimensional information as the subsidiary attribute data, an (n+1)-dimensional search can be performed with the n-dimensional spatial search index.

What is claimed is:

1. A method for processing data performed in a data processing system having a storage unit, comprising
    creating a spatial index having a tree structure comprising a leaf containing location information and attribute information other than the location information with respect to a plurality of objects to be searched, and storing the spatial index in the storage unit; and
    referring to the spatial index stored in the storage unit in response to an in input of a search request including location information and attribute information for searching the object to be searched under combined search conditions of spatial search condition based on the location information and attribute condition based on the attribute information, and extracting the object to be searched that agrees with the search request;
    wherein said referring to the spatial index for searching the object comprises:
    determining whether or not a pertinent geometry agrees with the spatial search condition of the spatial index for each object of the plurality of objects to be searched; and
    for each said object,
        if the pertinent geometry agrees with the spatial search condition of the spatial search index, obtaining at least one value of subsidiary attribute added to a record of the object;
        comparing the obtained value of subsidiary attribute added to the record of the object with the attribute condition of the spatial index to determine whether or not an attribute of the pertinent geometry agrees with the attribute condition of the spatial index; and
        if the attribute of the pertinent geometry agrees with the attribute condition of the spatial index, extracting the object as a searched result.

2. The method for processing data according to claim 1, wherein the attribute information is formed of bit information.

3. The method for processing data according to claim 1, wherein x-coordinate data and y-coordinate data of the object to be searched are allocated to the location information, and z-coordinate data of the object to be searched is allocated to the attribute information.

4. The method for processing data according to claim 1, wherein each leaf contained in the spatial index used as an n-dimensional spatial search index stores the attribute information in an additional axis of an (n+1)-dimension as the location information, to perform an (n+1)-dimensional spatial search by referring to the n-dimensional spatial search index.

5. The method for processing data according to claim 1, wherein the attribute information is subsidiary attribute information which is not related to location.

6. The method for processing data according to claim 1,
    wherein the spatial index includes a plurality of values that are designated as attribute conditions; and
    wherein the attribute of the pertinent geometry agrees with the attribute condition of the spatial index if at least one of the plurality of values that are designated as attribute conditions in the spatial index agrees with the obtained value of subsidiary attribute added to the record of the object.

7. The method for processing data according to claim 1,
    wherein the spatial index includes a plurality of values that are designated as attribute conditions, which are related by an AND condition;
    wherein a plurality of values of subsidiary attribute added to the record of the object are obtained;
    wherein the obtained values of subsidiary attribute added to the record of the object are compared with the attribute conditions of the spatial index to determine whether or not attributes of the pertinent geometry agree with the attribute conditions of the spatial index; and
    wherein the attributes of the pertinent geometry agree with the attribute conditions of the spatial index if the values that are designated as attribute conditions in the spatial index agree with the obtained values of subsidiary attribute added to the record of the object.

8. A computer-readable storage medium storing a plurality of instructions for controlling a data processor for data processing, the plurality of instructions comprising
    instructions that cause the data processor to create a spatial index having a tree structure comprising a leaf containing location information and attribute information other than the location information with respect to a plurality of objects to be searched, and store the spatial index in the storage unit; and
    instructions that cause the data processor to refer to the spatial index stored in the storage unit in response to an in input of a search request including the location information and the attribute information for searching the object to be searched under combined search conditions of spatial search condition based on the location information and attribute condition based on the attribute information, and extract the object to be searched that agrees with the search request;

wherein said instructions that cause the data processor to refer to the spatial index for searching the object comprise instructions that cause the data processor to:

determine whether or not a pertinent geometry agrees with the spatial search condition of the spatial index for each object of the plurality of objects to be searched; and for each said object,
- if the pertinent geometry agrees with the spatial search condition of the spatial search index, obtain at least one value of subsidiary attribute added to a record of the object;
- compare the obtained value of subsidiary attribute added to the record of the object with the attribute condition of the spatial index to determine whether or not an attribute of the pertinent geometry agrees with the attribute condition of the spatial index; and
- if the attribute of the pertinent geometry agrees with the attribute condition of the spatial index, extract the object as a searched result.

9. The computer-readable storage medium according to claim 8, wherein the attribute information is subsidiary attribute information which is not related to location.

10. The computer-readable storage medium according to claim 8,
   wherein the spatial index includes a plurality of values that are designated as attribute conditions; and
   wherein the attribute of the pertinent geometry agrees with the attribute condition of the spatial index if at least one of the plurality of values that are designated as attribute conditions in the spatial index agrees with the obtained value of subsidiary attribute added to the record of the object.

11. The computer-readable storage medium according to claim 8,
   wherein the spatial index includes a plurality of values that are designated as attribute conditions, which are related by an AND condition;
   wherein a plurality of values of subsidiary attribute added to the record of the object are obtained;
   wherein the obtained values of subsidiary attribute added to the record of the object are compared with the attribute conditions of the spatial index to determine whether or not attributes of the pertinent geometry agree with the attribute conditions of the spatial index; and
   wherein the attributes of the pertinent geometry agree with the attribute conditions of the spatial index if the values that are designated as attribute conditions in the spatial index agree with the obtained values of subsidiary attribute added to the record of the object.

12. The computer-readable storage medium according to claim 8, wherein the attribute information is formed of bit information.

13. The computer-readable storage medium according to claim 8, wherein x-coordinate data and y-coordinate data of the object to be searched are allocated to the location information, and z-coordinate data of the object to be searched is allocated to the attribute information.

\* \* \* \* \*